United States Patent

[11] 3,573,647

[72] Inventor Andreas Antoniou
Hounslow, England
[21] Appl. No. 797,564
[22] Filed Feb. 7, 1969
[45] Patented Apr. 6, 1971
[73] Assignee Her Majesty's Postmaster General
London, England
[32] Priority Feb. 9, 1968, Oct. 22, 1968
[33] Great Britain
[31] 6533/68 and 50113/68

[54] ELECTRICAL IMPEDANCE CONVERTING NETWORKS
10 Claims, 6 Drawing Figs.

[52] U.S. Cl. .......... 330/69, 330/103, 330/63, 333/80
[51] Int. Cl. .......... H03f 1/00, H03f 15/00
[50] Field of Search .......... 330/9, 30 (D), 69, 70

*Primary Examiner*—Nathan Kaufman
*Attorney*—Hall & Houghton

ABSTRACT: This specification describes networks having gyrator properties. Each network comprises two differential amplifiers, and four resistors (conveniently equal) connected in positive and negative feedback paths about the amplifiers. The feedback connections are such that the networks are unconditionally stable. When a network is capacitively terminated it input port impedance is inductive. If in each of a group of capacitively terminated networks one of the feedback resistors is replaced by one of a group of input ports of a network of resistors the input ports of the gyrator networks simulate corresponding input ports of a network of inductors topologically and proportionally the same as the resistor network.

ANDREAS ANTONIOU,

INVENTOR

BY

ATTORNEY

ANDREAS ANTONIOU,
INVENTOR
BY Hall & Houghton
ATTORNEY

ELECTRICAL IMPEDANCE CONVERTING NETWORKS

This invention relates to electrical impedance networks of the type which are capable of simulating inductances without the use of physical inductors.

With the introduction of microminiature circuitry it has become necessary to be able to simulate inductance by means of a circuit arrangement which does not use an inductor. For certain networks such as, for example, resonant circuits, inductance is required but with the use of transistors and integrated or thin film circuit devices by far the largest proportion of the bulk of circuit arrangement is occupied by the inductor. To overcome this difficulty it has been proposed to provide a device known as a gyrator, which has the property of producing at one port an impedance which is proportional to the inverse of the impedance connected across another port, so that if a capacitor is connected across the other port the device, together with the capacitor, when viewed from the one port behaves like an inductor. However, such devices as have hitherto been proposed have employed elaborate circuits and are consequently expensive or have been conditionally stable so that difficulty is experienced when the device is switched on. The term "conditionally stable" means that the device when operating is stable but during the initial period following the switching on as the gains of the amplifiers increase from zero to their working value, so the device passes through an unstable condition which causes the amplifiers to saturate, thereby limiting their effective gains and preventing the device from reaching the stable operating condition.

It is an object of the present invention to provide an improved network having the properties of a gyrator which is relatively simple and can be unconditionally stable.

According to the present invention there is provided an electrical impedance network comprising two high-gain differential amplifiers, each having noninverting and inverting input terminals and an output terminal at which an output signal is produced relative to earth, a connection including a first impedance from the output terminal of one amplifier to the noninverting input terminal of the other amplifier, connections respectively including a first resistor and a second impedance from the output terminal of the other amplifier to the noninverting and inverting input terminals of the one amplifier, a negative feedback connection including a second resistor connected from the output terminal of the one amplifier to the inverting input terminal of the same amplifier, a connection including a third resistor from the noninverting input terminal of the other amplifier to earth, a pair of input terminals, one of which is earthed and the other of which is connected to the noninverting input terminal of the one amplifier, and a connection from the inverting input terminal of the other amplifier directly to an input terminal of the one amplifier, one of the first and second impedances being a resistor and the other being an output load impedance, whereby the network presents at its input terminals an impedance which is proportional to the inverse of the output load impedance.

In order that the invention may be fully understood and readily carried into effect it will now be described with reference to the accompanying drawings of which:

Figure 1:
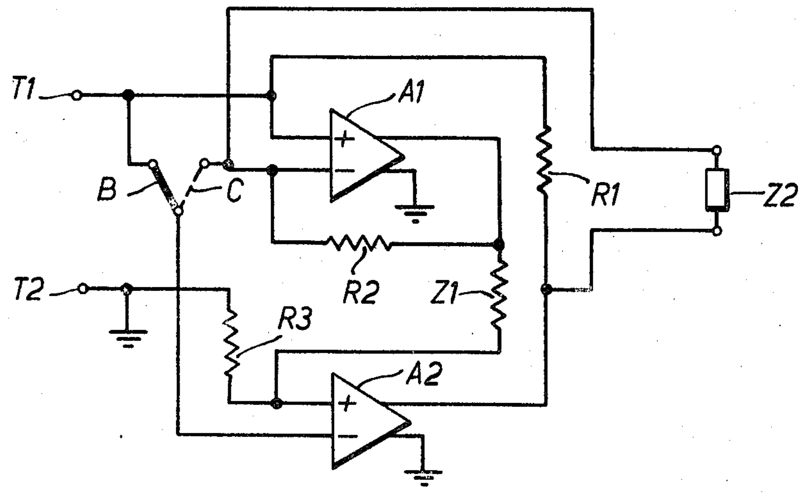
FIG. 1 is a diagram of one example of a network according to the invention.

Referring to the drawings, it will be seen that in FIG. 1 the input terminals T1 and T2 respectively are connected to the noninverting input terminal of an amplifier A1 and earth. The amplifier A1 has a negative feedback resistor R2 and its output is connected through resistor Z1 to the noninverting input of the second amplifier A2. This input terminal of the amplifier A2 is connected to earth through resistor R3. The output of amplifier A2 is connected through resistor R1 to the noninverting input of the amplifier A1 and also through the output load impedance Z2 to the inverting input of the amplifier A1. The inverting input terminal of the amplifier A2 is connected to either the noninverting input of the amplifier A1 through the connection B shown as a full line, or alternatively through the connection C to the inverting input of the amplifier A1, the connection being shown as a dotted line. Both amplifiers A1 and A2 are high-gain directly coupled differential amplifiers, sometimes referred to as "operational amplifiers" and may conveniently be provided as integrated circuits. In one example, the amplifiers are Philbrick operational amplifiers of the type P.85 AU. The following types of amplifiers have also been tried and found suitable.

Fairchild integrated operational amplifiers type:
∼ A702C, ∼ A709C, ∼ A741.

Motorola dual integrated operational amplifier type MC1435.

Circuit in FIG. 1, with either connection B or C made, has Z matrix parameters, $$Z_{11} \simeq 0$$

$$Z_{12} \simeq \frac{-R2R3}{Z_1}$$

$$Z_{21} \simeq R1$$

$$Z_{22} \simeq 0$$

when the gains of both amplifiers A1 and A2 are very large. Consequently, the two alternative connections correspond to gyrators for any value of Z1, R1, R2 and R3. The four resistances are usually made equal for convenience. The closeness with which the network simulates an ideal gyrator is proportional to the gain of the amplifiers. Useful results can be obtained with gains in excess of about 50, but more usefully, the gain value should be greater than 1,000 and preferably several tens of thousands. The pass bands of the amplifiers must include the operating frequencies of the network.

Figure 2:
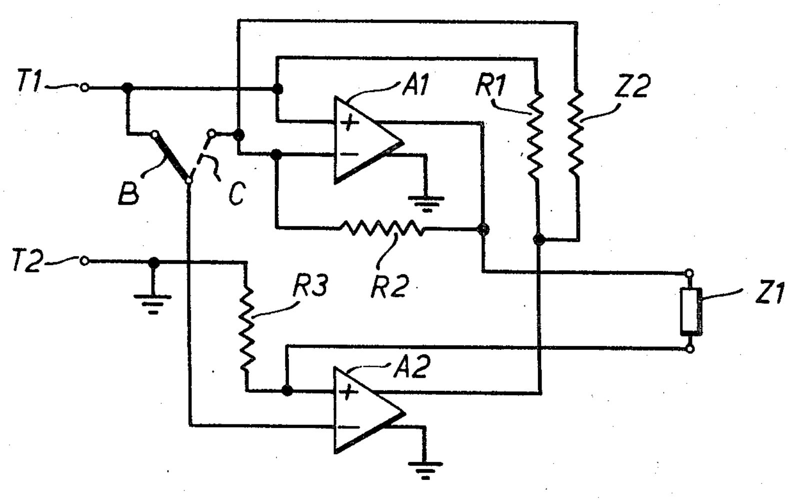
FIG. 2 is a diagram of another example of a network according to the invention.

The circuit arrangement of FIG. 2 is identical to that of FIG. 1 except that now Z1 becomes the output load impedance and Z2 becomes a resistor. When either connection B or C is made the circuit in FIG. 2 has matrix parameters, $$Z_{11} \simeq 0$$

$$Z_{12} \simeq -R_3$$

$$Z_{21} \simeq \frac{R1R2}{Z_2}$$

$$Z_{22} \simeq 0$$

when the gains of both amplifiers A1 and A2 are very large.

Gyrator circuits have been constructed according to the circuit arrangements shown in FIGS. 1 and 2 and using mica capacitors as the output load impedances Z2 and Z1 of FIGS. 1 and 2 respectively the input impedance measured across terminals T1 and T2 corresponds to that of an inductance having a Q factor in excess of 2,000.

Conveniently, a network according to the invention may be constructed as an integrated circuit so allowing the full advantage of miniaturisation to be obtained.

Figure 3A:
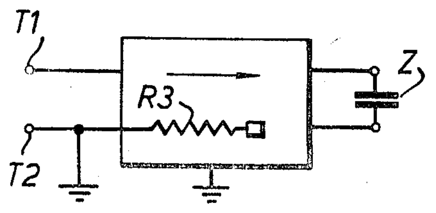
FIGS. 3A and 3B are to be used in explaining an alternative use for a network according to the invention.

FIG. 3A represents a gyrator circuit constructed according to FIG. 1 or FIG. 2 showing the connection of the resistor R3 to the grounded input terminal T2 and provided with an output load impedance Z. As described above, it will be appreciated that when Z is a capacitor the impedance appearing across the input terminals T1 and T2 is that of an inductor.

Figure 3B:
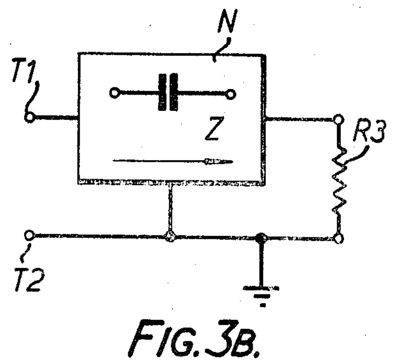

Consider now FIG. 3B which represents the gyrator circuit of FIG. 3A in which the output load impedance Z is included within the rectangle and the resistor R3 is taken outside it. We now have an arrangement which will behave as an inductor but has for its output load impedance the resistor R3, and moreover as one terminal of both the input and output ports is earthed the network has become a three-terminal network. From a consideration of the matrix parameters given above, it will be evident that variation in the value of resistor R3 will cause a variation in the magnitude of the inductance appearing at the input terminals T1 and T2. This property may be utilized by connecting several networks of the type shown in FIG. 3B to a purely resistive network to simulate a network of inductors.

Figure 4A:
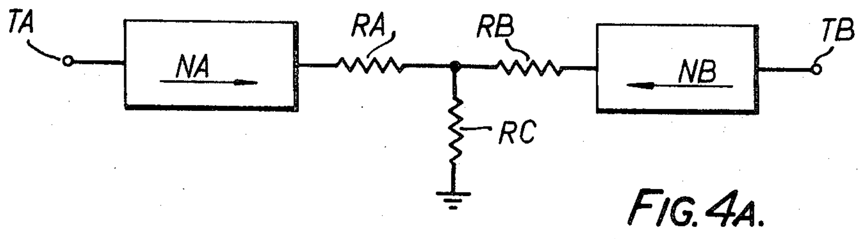
FIGS. 4A and 4B represent respectively one example of a network using the arrangement shown in FIG. 3B and the equivalent circuit of the network.
Figure 4B:
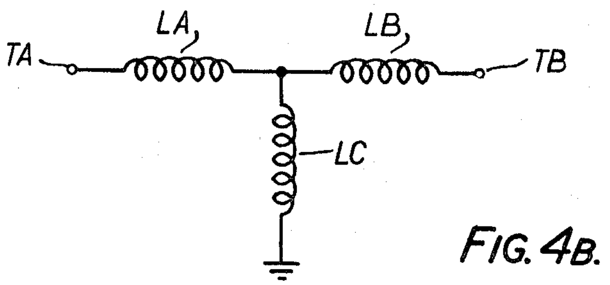

FIG. 4A shows a simple resistive network including resistors RA, RB and RC connected to a common point with the resistor RC connected to earth. By connecting networks NA and NB of the type represented by the rectangle in FIG. 3B to the free ends of resistors RA and RB as described above with respect to FIG. 3B the impedances appearing at the terminals TA and TB of networks NA and NB respectively will correspond to those of the three inductor network shown in FIG. 4B, where inductors LA, LB and LC are all connected to earth and the free ends of inductors LA and LB respectively connected to the terminals TA and TB. It will thus be appreciated that any resistive network may be converted into a topologically and quantitatively corresponding inductive network (in the example quoted LA, LB and LC are proportional to RA, RB and RC respectively). To convert it to an inductive network it is necessary to connect to each port of an *n*-port resistive network an impedance network according to FIG. 1 or 2, having a capacitor as its output load impedance. Each impedance network is connected to the *n*-port network at its new output port as described above with respect to FIG. 3B. The input ports of the impedance networks so connected provide the electrical characteristics of an *n*-port inductive network corresponding to the resistive network.

Although the invention has been described and illustrated in terms of preferred embodiments other forms and modifications are possible within the scope of the invention. For example, in the circuits shown in FIGS. 1 and 2 the use of voltage controlled sources (operational amplifiers) has been described but high-gain current controlled voltage sources and voltage or current controlled current sources can alternatively be used.

I claim:

1. An electrical impedance network comprising two high-gain differential amplifiers, each having noninverting and inverting input terminals and an output terminal at which an output signal is produced relative to earth, a connection including a first impedance from the output terminal of one amplifier to the noninverting input terminal of the other amplifier, connections respectively including a first resistor and a second impedance from the output terminal of the other amplifier to the noninverting and inverting input terminals of the one amplifier, a negative feedback connection including a second resistor connected from the output terminal of the one amplifier to the inverting input terminal of the same amplifier, a connection including a third resistor from the noninverting input terminal of the other amplifier to earth, a pair of input terminals, one of which is earthed and the other of which is connected to the noninverting input terminal of the one amplifier, and a connection from the inverting input terminal of the other amplifier directly to an input terminal of the one amplifier, one of the first and second impedances being a resistor and the other being an output load impedance, whereby the network presents at its input terminals an impedance which is proportional to the inverse of the output load impedance.

2. An electrical impedance network as claimed in claim 1 wherein the connection from the inverting input terminal of the other amplifier directly to an input terminal of the one amplifier is connected to the noninverting input terminal of that amplifier.

3. An electrical impedance network as claimed in claim 2 wherein the first impedance is a resistor, and the second impedance is the output load impedance.

4. An electrical impedance network as claimed in claim 2 wherein the first impedance is the output load impedance, and the second impedance is a resistor.

5. An electrical impedance network as claimed in claim 1 wherein the output load impedance is a capacitor so that the impedance at the input terminals is effectively inductive.

6. An electrical impedance network according to claim 5 wherein the four resistances are equal in value.

7. A circuit arrangement including a resistive network having a grounded terminal and a plurality of other terminals, a plurality of networks according to claim 6 in which the connections from the noninverting inputs of the other amplifiers to the third resistor are replaced by output connections respectively connected to the other terminals of the resistive network, whereby the circuit arrangement simulates a network of inductors topologically and quantitatively corresponding to the resistive network.

8. An electrical impedance network as claimed in claim 1 wherein the connection from the inverting input terminal of the other amplifier directly to an input terminal of the one amplifier is connected to the inverting input terminal of that amplifier.

9. An electrical impedance network as claimed in claim 8 wherein the first impedance is a resistor, and the second impedance is an output load impedance.

10. An electrical impedance network as claimed in claim 8 wherein the first impedance is the output load impedance, and the second impedance is a resistor.